United States Patent
Boland et al.

(10) Patent No.: US 11,394,331 B2
(45) Date of Patent: Jul. 19, 2022

(54) METHOD AND SYSTEM FOR CONSTANT TEMPERATURE CONTROL OF MOTORIZED SPINDLES

(71) Applicant: ANCA Pty Ltd, Bayswater North (AU)

(72) Inventors: Patrick Gerard Boland, Bayswater North (AU); Kotler Ter Pey Tee, Bayswater North (AU); David Fisher, Montrose (AU); Lijiang Qin, Bayswater (AU)

(73) Assignee: Anca Pty Ltd, Victoria (AU)

( * ) Notice: Subject to any disclaimer, the term of this patent is extended or adjusted under 35 U.S.C. 154(b) by 0 days.

(21) Appl. No.: 16/765,050

(22) PCT Filed: Nov. 15, 2018

(86) PCT No.: PCT/AU2018/051219
§ 371 (c)(1),
(2) Date: May 18, 2020

(87) PCT Pub. No.: WO2019/095009
PCT Pub. Date: May 23, 2019

(65) Prior Publication Data
US 2020/0366233 A1    Nov. 19, 2020

(30) Foreign Application Priority Data
Nov. 17, 2017 (AU) ................. 2017904657

(51) Int. Cl.
*H02P 27/04* (2016.01)
*H02P 29/64* (2016.01)

(52) U.S. Cl.
CPC ............ *H02P 27/047* (2013.01); *H02P 29/64* (2016.02); *H02P 2207/01* (2013.01)

(58) Field of Classification Search
CPC ............................ H02P 27/047; H02P 29/64
(Continued)

(56) References Cited

U.S. PATENT DOCUMENTS

| | | | | | |
|---|---|---|---|---|---|
| 4,926,105 | A | * | 5/1990 | Mischenko | ............. H02P 21/06 318/800 |
| 5,227,703 | A | * | 7/1993 | Boothe | ..................... B60L 3/00 318/139 |

(Continued)

FOREIGN PATENT DOCUMENTS

| | | |
|---|---|---|
| DE | 602005005625 T2 | 6/2009 |
| DE | 102010062338 A1 | 6/2012 |

(Continued)

OTHER PUBLICATIONS

International Preliminary Report on Patentability issued in related PCT/AU2018/051219 dated Mar. 26, 2020.
(Continued)

*Primary Examiner* — David Luo
(74) *Attorney, Agent, or Firm* — Woodard, Emhardt, Henry, Reeves & Wagner, LLP

(57) ABSTRACT

The present invention provides a method and system for controlling the temperature of an electric motor by adjusting the electric losses in the motor. In an embodiment, the required load on the motor is determined and a first motor voltage is provided to meet the required load. A predetermined temperature set point for the motor is compared against the temperature of the motor and based on the temperature of the motor and the predetermined temperature set point, a secondary motor voltage is determined. The motor voltage may then be adjusted based on the calculated voltage and the motor load measurement adjusted based on the measured motor speed and actual motor voltage.

12 Claims, 9 Drawing Sheets

(58) Field of Classification Search
USPC .................. 318/809, 807, 767, 727
See application file for complete search history.

(56) References Cited

U.S. PATENT DOCUMENTS

| | | | | |
|---|---|---|---|---|
| 9,479,102 | B2* | 10/2016 | Park | .............. H02P 21/141 |
| 9,496,817 | B1 | 11/2016 | Lepka | |
| 9,755,558 | B2* | 9/2017 | Lai | .............. B60W 10/08 |
| 2006/0178761 | A1 | 8/2006 | Besuchet | |
| 2011/0050141 | A1 | 3/2011 | Yeh | |
| 2014/0125268 | A1 | 5/2014 | Garcia | |
| 2015/0002054 | A1 | 1/2015 | Frankstein | |
| 2015/0202966 | A1 | 7/2015 | Oyama | |
| 2015/0249419 | A1 | 9/2015 | Lee | |
| 2016/0000141 | A1 | 1/2016 | Koyama | |
| 2019/0048990 | A1 | 2/2019 | Lasch | |

FOREIGN PATENT DOCUMENTS

| | | |
|---|---|---|
| DE | 112013004242 T5 | 7/2015 |
| DE | 102015110290 A1 | 1/2016 |
| DE | 102016206765 A1 | 10/2017 |

OTHER PUBLICATIONS

International Search Report issued in related PCT/AU2018/051219 dated Jan. 21, 2019.
Written Opinion issued in related PCT/AU2018/051219 dated Jan. 21, 2019.
Extended Search Report issued by European Patent Office in related EP18879586.8 dated Jan. 7, 2022 (pp. 14).
Korean Examination Report issued in related Application No. 10-2020-7017296 dated Dec. 14, 2021 (pp. 7).
Machine Translation of Korean Examination Report issued in related Application No. 10-2020-7017296 dated Dec. 14, 2021 (pp. 8).

* cited by examiner

METHOD AND SYSTEM FOR CONSTANT TEMPERATURE CONTROL OF MOTORIZED SPINDLES

TECHNICAL FIELD

The present invention relates to a system method and apparatus for constant temperature control of motorized spindles.

BACKGROUND OF INVENTION

Motorised spindles are driven by electric motors whose stator and rotor are integral parts of the spindle. Typically, spindles are used in an environment of unpredictable speed and torque loads, leading to varying losses in the motor, which consequently causes temperature variations. As a result, the motorised spindle experiences dimension variations that cause changes in the dimensions of the workpiece. When accuracy is required at high tolerance levels (i.e. micron and sub-micron levels), even very minor dimensional changes due to temperature can have an effect on the production of accurately machined parts. Such thermal effect in motorised spindles is still an open problem.

One existing approach to reduce the effect of thermal effect is to "warm up" the motorised spindle to operating temperature before the machining operations commence, and then maintaining this operation temperature.

One way to control the operating temperature is to carefully control the load (i.e. the motor speed and load on the motor) such that the motor loss is more or less the same as heat dissipation.

Another way of maintaining the operating temperature is to actively control the coolant temperature. This normally requires a temperature control system in which the coolant temperature can be measured and the coolant can be heated up or/and cooled down so that any dimensional changes (due to temperature) occur prior to machining taking place. However, a problem with this arrangement is that it increases the set-up time/down time which is undesirable and is problematic when there are further temperature changes and therefore further dimensional changes during machining.

It would therefore be desirable to provide a system method and apparatus which ameliorates or at least alleviates one or more of the above problems.

Before turning to a summary of the present invention, it will be appreciated that the discussion of the background to the invention is included to explain the context of the invention. This is not to be taken as an admission that any of the material referred to is published, known or part of the common general knowledge.

SUMMARY OF INVENTION

The present invention provides a method to exploit the motor capability so as to actively control the motor temperature with a temperature controller embedded in the motor drive. The method may be applied in embedded axis drives and a variety of motor types, including but not limited to: rotary motors, linear motors, motorised spindles, synchronous motors including permanent magnet spindle motors and asynchronous motors including induction motors. In applications where the motor is an integral part of a larger component such as a spindle, the heat losses are then transferred to other components of the spindle which can cause proportional dimensional changes. Even minor dimensional changes can have a significant effect on the production of accurately machined work pieces. Heat can also be dissipated from the motor to other machine components in the vicinity of the motor. This is particularly problematic for high precision machines with thermally sensitive components in the vicinity of the motor. In high precision machines, the thermal effect on the accuracy and repeatability of the machine can be significant. The invention can be applied to reduce the thermal effect on these components or affect the components in a more predictable manner.

It will be appreciated that the term 'load' refers to the load on the motor together with the speed of the motor, so the required load may include both the load required of the motor and the required speed of the motor. This may be rotary or linear for example, depending on the type of motor.

In a first aspect, the present invention provides method of controlling the temperature of an induction motorized spindle by adjusting the electric losses in the induction motorized spindle, including the steps of: (a) determining the required load on the induction motorized spindle and providing a first motor voltage to meet the required load; (b) providing a predetermined temperature set point for the induction motorized spindle; (c) determining the temperature of the induction motorized spindle; (d) comparing the temperature of the induction motorized spindle against the predetermined temperature set point; (e) determining, based on the temperature of the induction motorized spindle and the predetermined temperature set point, a secondary motor voltage; (f) adjusting the motor voltage based on the calculated voltage in steps (a) and (e).

The present invention determines the required load on the motor and adjusts a first voltage to meet the required load. In the event that the temperature is below the threshold temperature, a second voltage may be applied to the motor which may increase the temperature towards the predetermined temperature set point. Advantageously, while some motor efficiency is sacrificed, the motor operates at a constant temperature which in applications such as CNC systems, allows for a reduction in a likelihood of dimensional changes due to temperature while machining.

Step (f) may include increasing the second motor voltage if the temperature is below the predetermined temperature. In an alternative, step (f) may include decreasing the second motor voltage if the temperature is above the predetermined temperature set point.

In an alternative, the motor may be an induction motor where step (f) includes varying the flux in the motor by varying the motor voltage.

The predetermined temperature may be a temperature range or may be a specific temperature. Preferably, at step (d), the temperature of the motor is compared against the predetermined temperature set point over a predetermined time period. The predetermined time period may be 120 ms.

In a second aspect, the present invention provides a method of controlling the temperature of a synchronous motorised spindle where the varying losses are modified by varying flux producing current, and still satisfying load and speed requirements, wherein the method includes the steps of: (a) determining the required load on the synchronous motorised spindle and providing a first motor voltage to meet the required load; (b) providing a predetermined temperature set point for the synchronous motorised spindle; (c) determining the temperature of the synchronous motorised spindle; (d) comparing the temperature of the synchronous motorised spindle against the predetermined temperature set point; (e) adjusting the motor flux producing current, and still satisfying load and speed requirements.

In a third aspect, the present invention provides, a system for controlling the temperature of an induction motorized spindle by adjusting the electric losses in the induction motorized spindle, the system including: an interface for providing one or more parameters to a CNC component which controls one or more drive units and in turn one or more induction motorized spindles, the CNC component programmed to: (a) determine the required load on the induction motorized spindle and providing a first motor voltage to meet the required load; (b) provide a predetermined temperature set point for the induction motorized spindle; (c) determine the temperature of the induction motorized spindle; (d) compare the temperature of the induction motorized spindle against the predetermined temperature set point; (e) determine, based on the temperature of the induction motorized spindle and the predetermined temperature set point, a secondary motor voltage; (f) adjust the motor voltage based on the calculated voltage in steps (a) and (e); and (g) adjust the motor load measurement based on the measured motor speed and actual motor voltage.

Preferably the predetermined temperature set point for the motor of step (b) is set by the operator depending on the desired load sequence.

Preferably step (g) includes incorporating a motor datasheet associated with the motor, when adjusting the motor load measurement. For example, normal motor speed control may be applied using the normal V/F from the motor datasheet.

In a fourth aspect, the present invention provides a system for controlling the temperature of a synchronous motorized spindle, wherein the losses are modified by varying a flux producing current, and still satisfying load and speed requirements, the system further including: an interface for providing one or more parameters to a CNC component which controls one or more drive units and in turn one or more synchronous motorized spindles, the CNC component programmed to: (a) determine the required load on the synchronous motorized spindle and providing a first motor voltage to meet the required load; (b) provide a predetermined temperature set point for the synchronous motorized spindle; (c) determine the temperature of the synchronous motorized spindle; (d) compare the temperature of the synchronous motorized spindle against the predetermined temperature set point; and (e) adjust the motor flux producing current, and still satisfying load and speed requirements.

In a fifth aspect, the present invention provides an electric motor control system including: an interface for providing one or more parameters to one or more drive units which regulates the temperature of one or more motors by adjusting the motor's terminal voltage whilst maintaining specified speed and torque, wherein the motor is integrated into a machine tool spindle.

Preferably, the motor is integrated into a machine tool spindle. It will be appreciated that the motor may be a synchronous motor or an induction motor, where its losses are modified by varying voltages in phase with the motor flux.

In a sixth aspect, the present invention provides a method of controlling the temperature of an electric motor having a motorised spindle and constant temperature controller including the steps of: (a) providing a desired temperature set point for the motorised spindle; (b) selectively applying, in response to the status of the constant temperature controller: (i) constant voltage/frequency to control the speed of a motor where the constant temperature controller is disabled; else (ii) a controlled voltage to the motor such that there is sufficient power to rotate the motor for the given speed and load and adjusting the temperature via the constant temperature controller.

Preferably, the method further includes: determining the speed of the motorised spindle and in response to the speed of the motorised spindle being equal to zero; (i) controlling the motorised spindle via constant temperature control at zero speed; else, if the speed is not zero: (ii) applying a controlled voltage to the motor such that there is sufficient power to rotate the motor for the given speed and load and adjusting the temperature via the constant temperature controller.

DETAILED DESCRIPTION

Figure 1A:
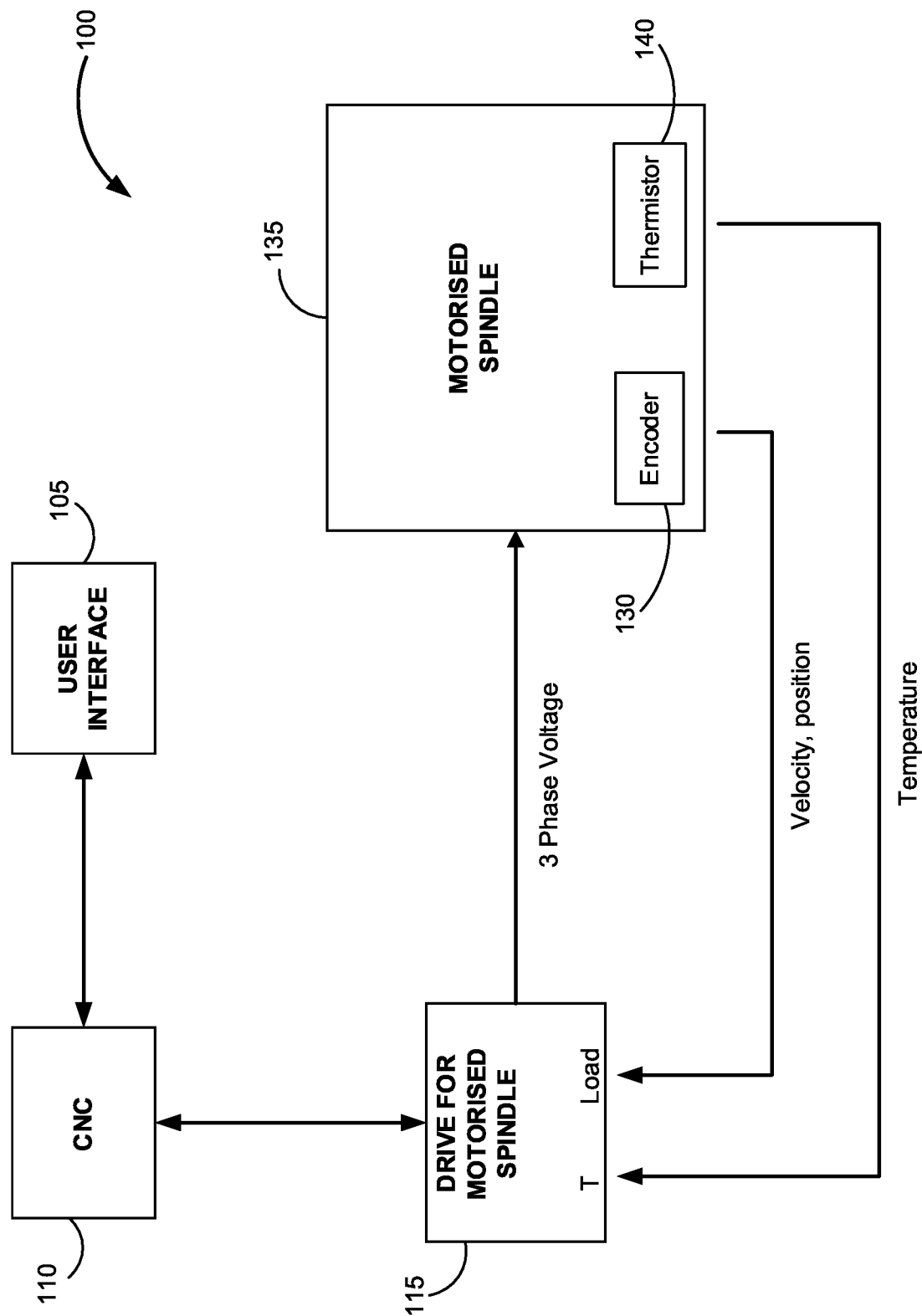
FIG. 1a is a schematic diagram of typical elements in a CNC controlled motorised spindle system, on which the present invention may operate.

FIG. 1a is a schematic diagram of typical elements in a CNC (computer numerical controlled) system 100 used to control one or more motors and/or one or more motorised spindles. The present invention will be described with reference to motors involved in CNC environments and machine tooling but need not be limited to that. The present invention may be applied to control different types of motors in any application where constant temperature is required. In the preferred embodiment, the CNC system 100 is capable of machining complex parts to micron level tolerances.

The term 'motorised spindle' as used in this specification may be a motor, a spindle, or a motorised spindle. As will be appreciated, the motor 135 need not be a rotary or linear type, it could take any form including permanent magnet spindles for example. In the first embodiment, the motor 135 is an induction motor. It will be understood that in this embodiment, the magnetic flux generated by the induction motor is proportional to the voltage applied to the induction motor.

In the embodiment, the load (i.e. its speed and the load) of the motor is of primary concern and temperature is of secondary concern. The temperature variation is limited to the minimum range.

The CNC system 100 includes a user interface 105 where various parameters may be entered relating to the CNC system 100. One of the parameters may be a desired set temperature at which the motor is to be kept. The user interface 105 may have a number of components such as a part program interpreter, a programmable logic controller and a servo command interpolator and the like (not shown). A CNC component 110 may send position and/or velocity commands to a drive unit 115 to control the motor or the motorised spindle 135 in the preferred embodiment. It will be noted that a thermistor 140 is embedded in the motor winding, to measure the motor temperature and feedback the read temperature to the drive, as shown in FIG. 1a.

In addition, an encoder or proxy switch 130 is provided to obtain and accept the position and velocity feedback from the motor to the drive 115. It will be appreciated that there may be one or more motors 135 controlled by the system 100.

Figure 1B:
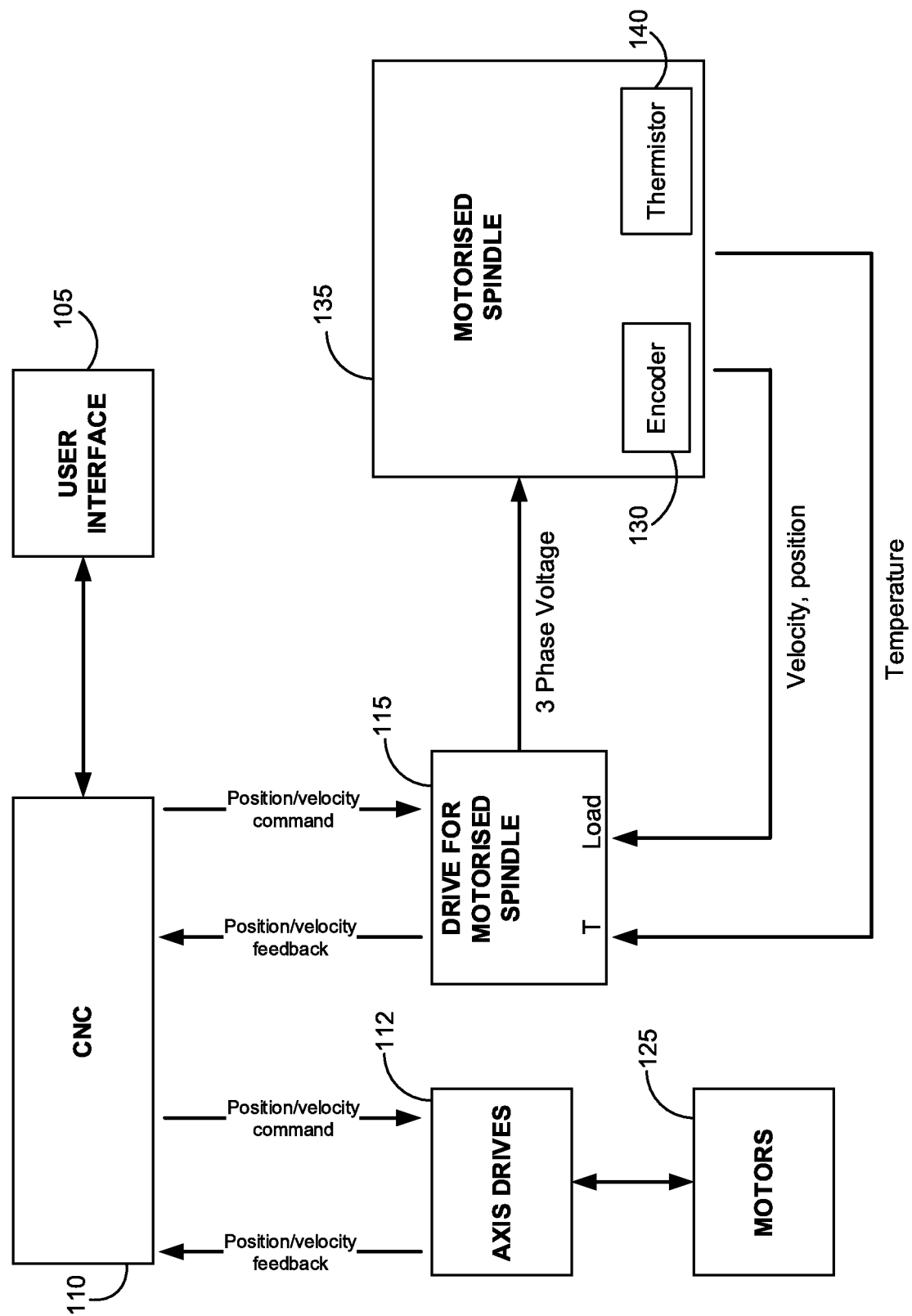
FIG. 1b is a schematic diagram of typical elements in a CNC controlled motorised spindle system, including multiple axis driven by the motorised spindle.

The CNC system 100 may also include a number of moveable axes each associated with a separate motor 125 and its drive 112, as shown in FIG. 1b. Each motor 135 is controlled by a voltage provided by its associated drive 115. When the motor 135 is in operation it converts electrical energy into rotary or linear movement.

As shown in FIG. 1b, it will be appreciated the CNC system 100 may also include multiple motorised spindles 115 and each of these can be controlled by the method of the present invention. For clarity, FIG. 1b shows one motorised spindle 115 only. As the motor 135 operates to meet the required varying speed and load requirements, its temperature rises and falls according to heat losses.

The present invention comprises a method to explore the motor capability so as to actively maintain the motor temperature without needing an extra temperature controller. The motor temperature is controlled by a software method embedded in the drive that controls the motor. Advantageously this does not require extra hardware.

Figure 3A:
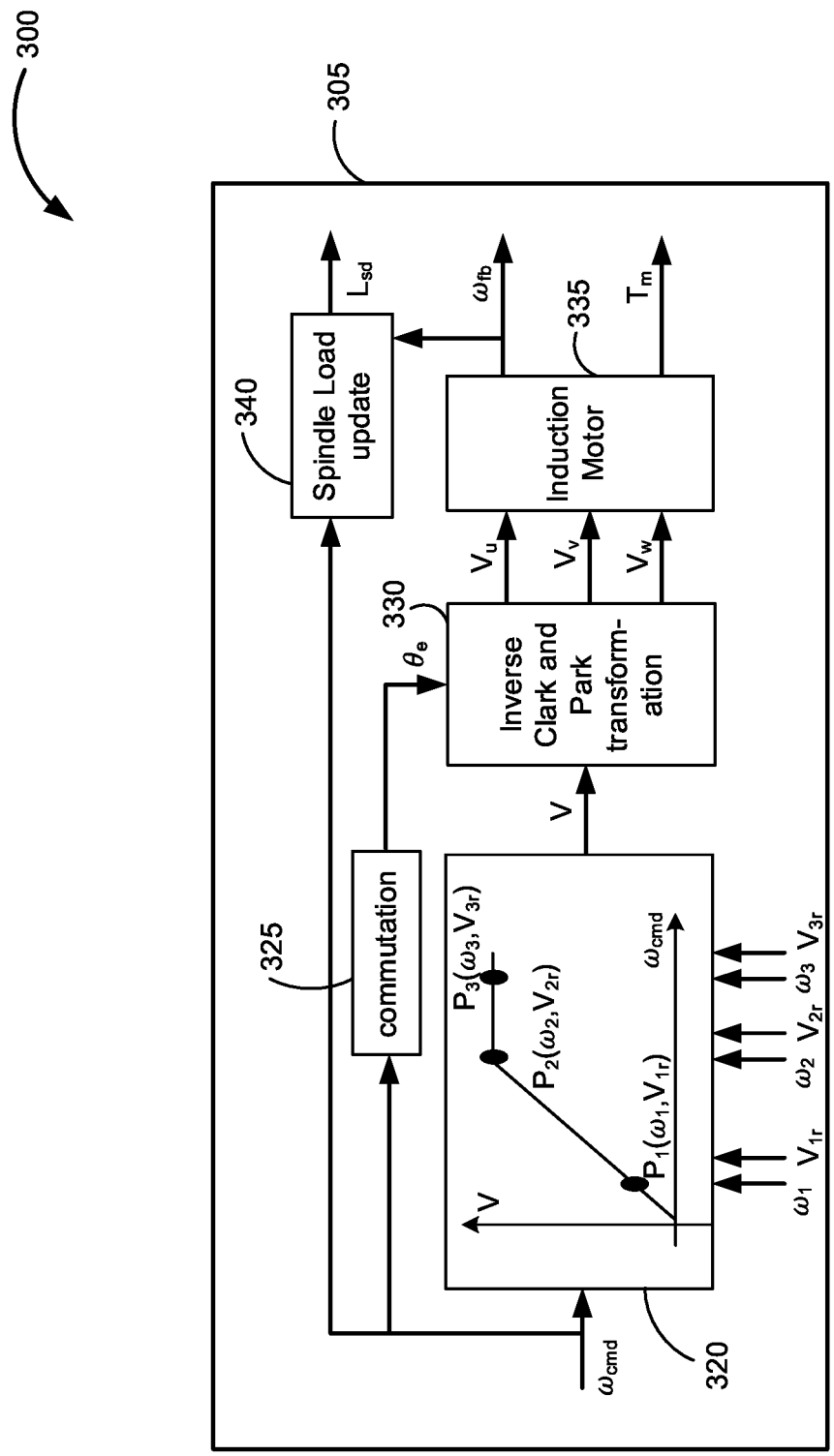
FIG. 3a is a schematic diagram, illustrating the operation of a constant voltage/frequency speed control of an induction motor.

FIG. 3a is a diagram 300 showing a constant voltage/frequency approach, to control the speed of a motor 135, known as a V/F curve. A number of components 305 common to FIGS. 3a and 3b are provided, including the V/F curve 320, a commutation component 325, calculation component 330, induction motor 335 and spindle load update component 340.

Figure 3B:
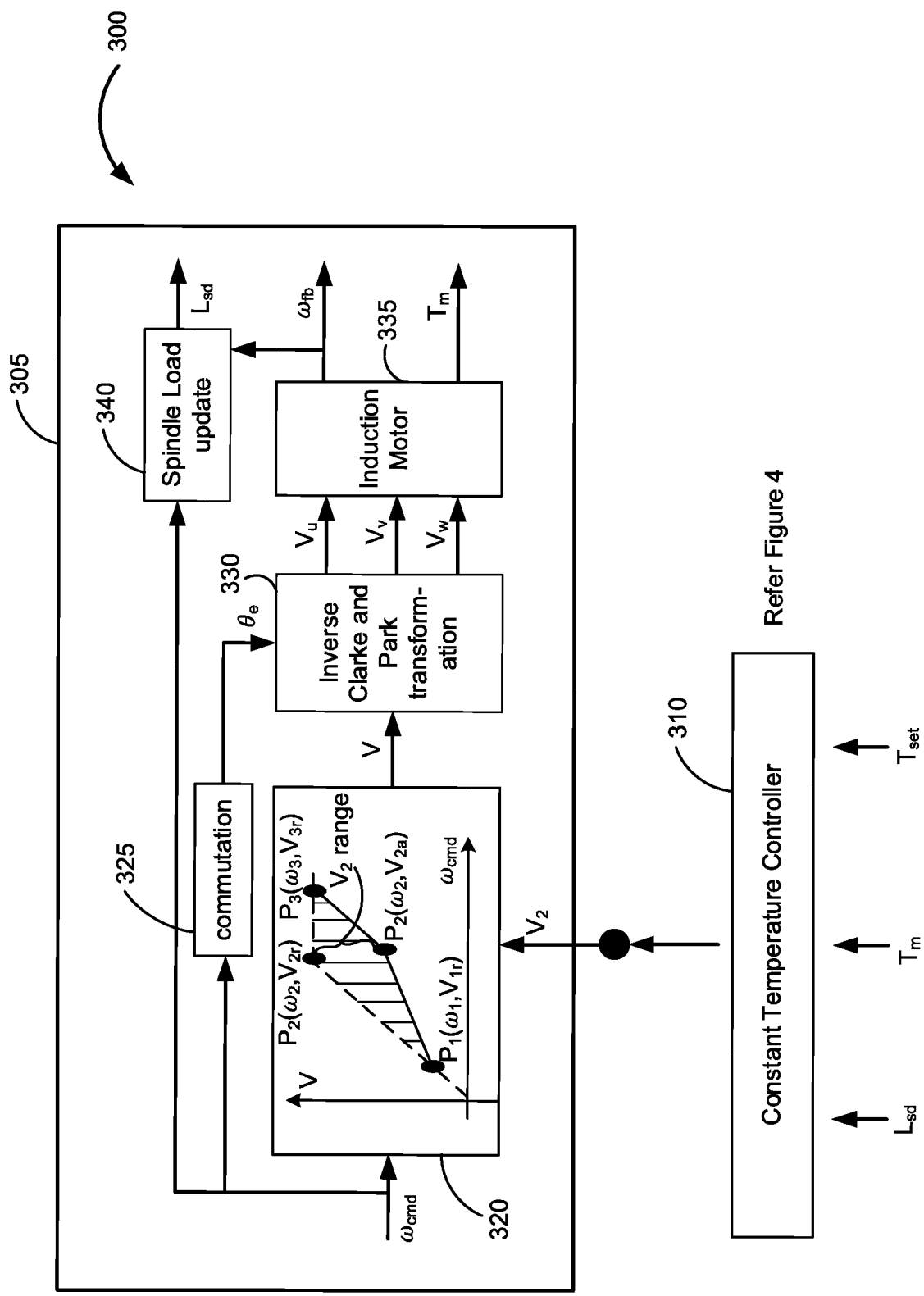
FIG. 3b is a schematic diagram, illustrating V/F control of an induction motor, with constant temperature control.

FIG. 3b is a diagram showing constant voltage/frequency control of an induction motor, according to the method of the invention.

While the present example describes the control strategy for controlling a motor 335 in the form of scalar control (V/F) to achieve constant temperature of the motor in a closed loop system; it will be appreciated that other methods may be provided such as vector control and direct torque control.

As shown in FIG. 3b, voltage V2 is an adjustable parameter that is applied to the V/F curve.

As shown in FIG. 1a, this is achieved by measuring the required load on the motorised spindle 135 and adjusting the motor voltage via the drive 115 to maintain constant temperature and meet the required load/speed. In the event that the temperature is below a threshold temperature set point, the voltage of the motor may be increased by applying a second voltage ($V_{2b}$ which will be further described with reference to FIG. 4) which may increase the temperature towards the predetermined temperature set point.

While some motor efficiency is sacrificed, the motor 135 operates at a constant temperature, which in applications such as CNC systems 100, advantageously allows for a reduction in a likelihood of dimensional changes due to temperature, and the resulting effect on the production of accurately machined work pieces in the preferred embodiment of machine tools.

Figure 2A:
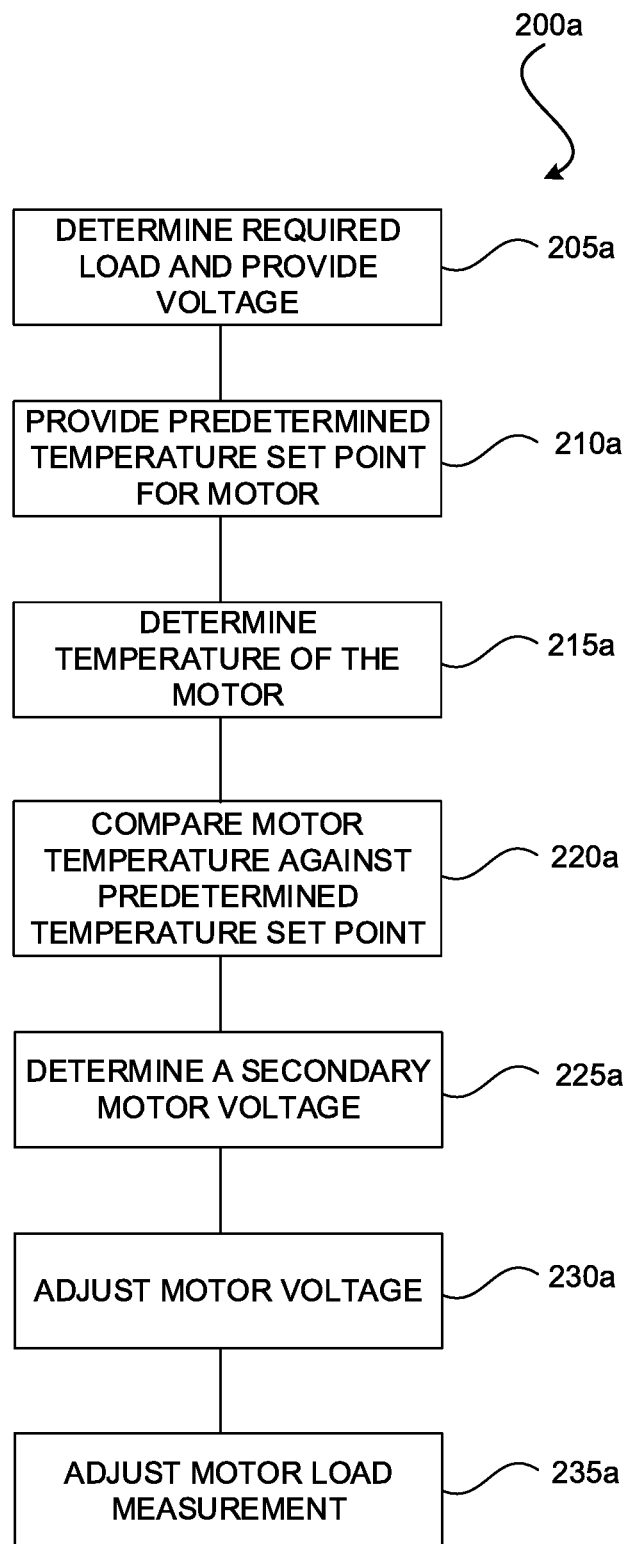
FIG. 2a is a flow diagram illustrating a method of the present invention for controlling the temperature of the electric motor by adjusting the electric losses.

FIG. 2a is a flow diagram illustrating a method 200a of the present invention for controlling the temperature of the electric motor by adjusting the electric losses. The method may be carried out in software or firmware within hardware on a CNC system 100 or may reside in a computer associated with a system which controls operation of a motorised spindle 135.

The method 200a begins at step 205a where the required load on the motor is determined and a first motor voltage is provided to meet the required load. Control then moves to step 210a where a predetermined temperature set point is provided for the motor. Control moves then to step 215a where the temperature of the motor is determined before control moves to step 220a where the temperature of the motor is compared against the predetermined temperature set point. Control then moves to step 225a where it is determined, based on the temperature of the motor and the predetermined temperature set point and a secondary motor voltage before control moves to step 230a where the motor voltage is adjusted based on the calculated voltage in steps 205a and 225a. Control then moves to step 235a where the motor load measurement is adjusted based on the measured motor speed and actual motor voltage.

Figure 2B:
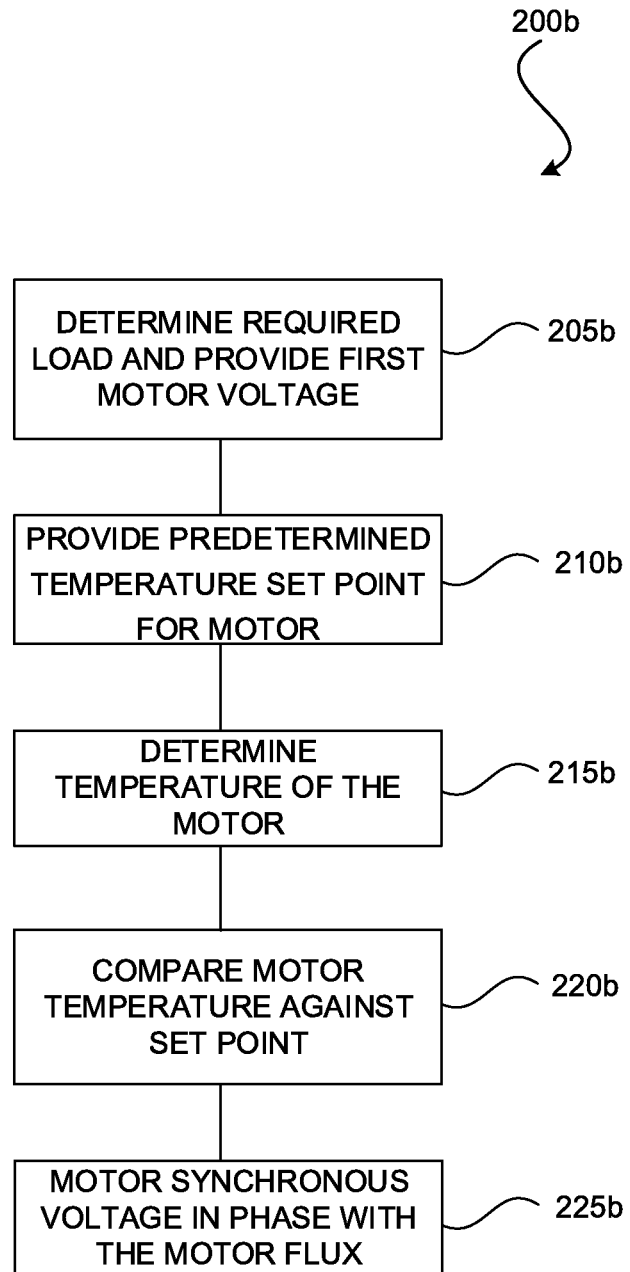
FIG. 2b is a flow diagram illustrating a method of the present invention for controlling the temperature of a synchronous motor, wherein the losses are modified by varying a synchronous voltage in phase with the motor flux.

FIG. 2b is a flow diagram illustrating a method 200b of the present invention for controlling the temperature of a synchronous motor, wherein the losses are modified by varying a synchronous voltage in phase with the motor flux. The method may be carried out in software or firmware within hardware on a CNC system 100 or may reside in a computer associated with a system which controls operation of a motorised spindle 135.

The method 200b begins at step 205b the required load on the motor is determined and a first motor voltage to meet the required load is provided. Control then moves to step 210b where a predetermined temperature set point for the motor is provided. Control then moves to step 215c where the temperature of the motor is determined before control then moves to step 220b where the temperature of the motor is compared against the predetermined temperature set point. Control then moves to step 225b where motor synchronous voltage is adjusted in phase with the motor flux.

Figure 2C:
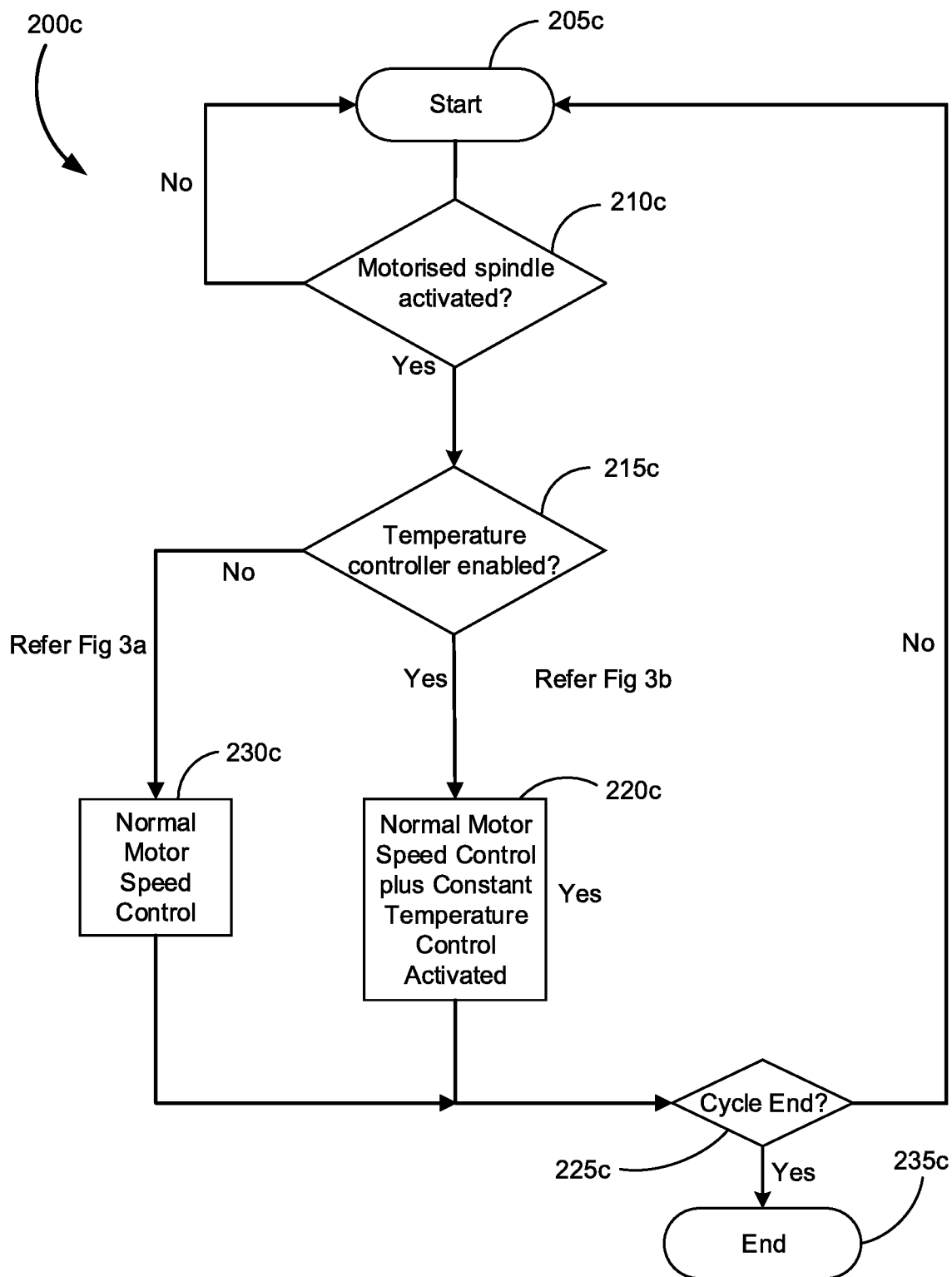
FIG. 2c is a flow diagram illustrating the method of the present invention; including detail of steps for constant temperature control in operation.

FIG. 2c is a flow diagram illustrating the method 200c of an embodiment of the present invention which may lie in software or firmware within hardware on a CNC system 100 or may reside in a computer associated with a system which controls operation of a motorised spindle 135.

The method 200c begins at step 205c, where a user may, via the user interface 105 of FIG. 1a, enter a desired temperature set point for the motorised spindle 135.

Control then moves to step 210c, where it is determined whether or not the motorised spindle has been activated (for example by the user via user interface 105).

In the event that the motorised spindle 135 is activated, control moves to step 215c in which it is determined whether the constant temperature controller 310 is enabled otherwise, if at step 210c the motor spindle has not been activated, control returns to step 205c.

If step 215c determines that the constant temperature controller 310 is enabled, control moves to step 220c in which the motorised spindle 135 is controlled via voltage provided from the drive for the motorised spindle 115 as per FIG. 1a. The motorised spindle 135, as per FIG. 1a, is fitted with an encoder/proxy switch 130 to provide feedback signals on the position or velocity of the motorized spindle 135 and temperature by the thermistor 140. As noted above, the drive 115 controls the position and speed of the motorised spindle 135 and may store data generated while the motorised spindle 135 is in operation.

Returning to FIG. 2c, control then moves to step 220c in which the control voltage to the motor will be adjusted such that there is sufficient power to rotate the motor for the given speed and load and the temperature is also adjusted.

The constant temperature controller 310 will be further described with reference to FIGS. 3b and 4. The calculation performed in step 220c is performed by the constant temperature controller 310 in FIG. 3b.

Figure 4:
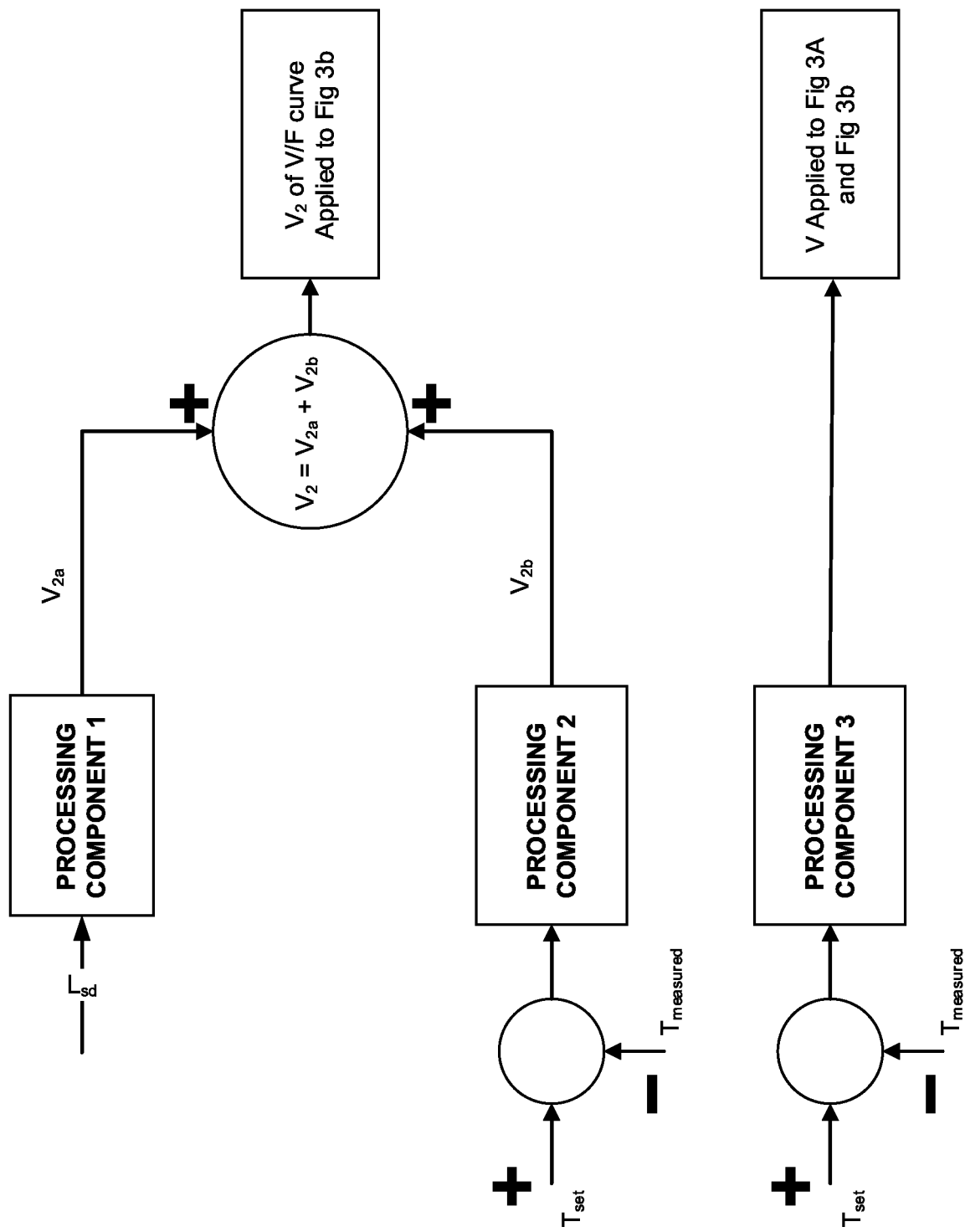
FIG. 4 is a schematic diagram illustrating the operation of the constant temperature controller of FIG. 3b.

The operation of the first embodiment of the constant temperature controller 310 consists of processing components 1, 2 and 3 as shown in FIG. 4.

The calculation of V2, to be used in step 225c of the flow diagram 200c is shown in FIG. 4.

Voltage V2 is the sum of the outputs of processing components 1 and 2. The input for processing component 1 is the spindle load percentage $L_{sd}$ which is the spindle load percentage provided from the encoder. The output of processing component 1 is voltage $V_{2a}$, which is the minimum value for V2 on the V/F curve of FIG. 3a, such that the motor provides sufficient power to rotate the spindle for the given spindle load $L_{sd}$.

Processing component 2 further adjusts the voltage V2, so that the temperature can be adjusted as the magnetic flux is adjusted.

As shown in FIG. 4, processing component 2 receives $T_{measured}$ as an input which is the actual motor temperature in degrees and $T_{set}$ which is the desired motor temperature set by the operator in degrees. The difference between these temperatures is an input for processing component 2. Processing component 2 provides its output voltage $V_{2b}$ which is an additive breakpoint 2 voltage for constant temperature control measured in volts.

Outputs $V_{2b}$ and $V_{2a}$ are summed at a junction to provide $V_2$ which is the voltage at breakpoint 2 ($P_2$) measured in volts. $V_2$ is then an input for component 320 in FIG. 3b. Component 320 outputs voltage V, the voltage magnitude determined for spindle speed WCMD as shown in FIG. 3b.

As shown in FIG. 3b, the output of the Constant Temperature Controller, V2, is applied to the V/F curve of the Induction Motor.

Figure 5:
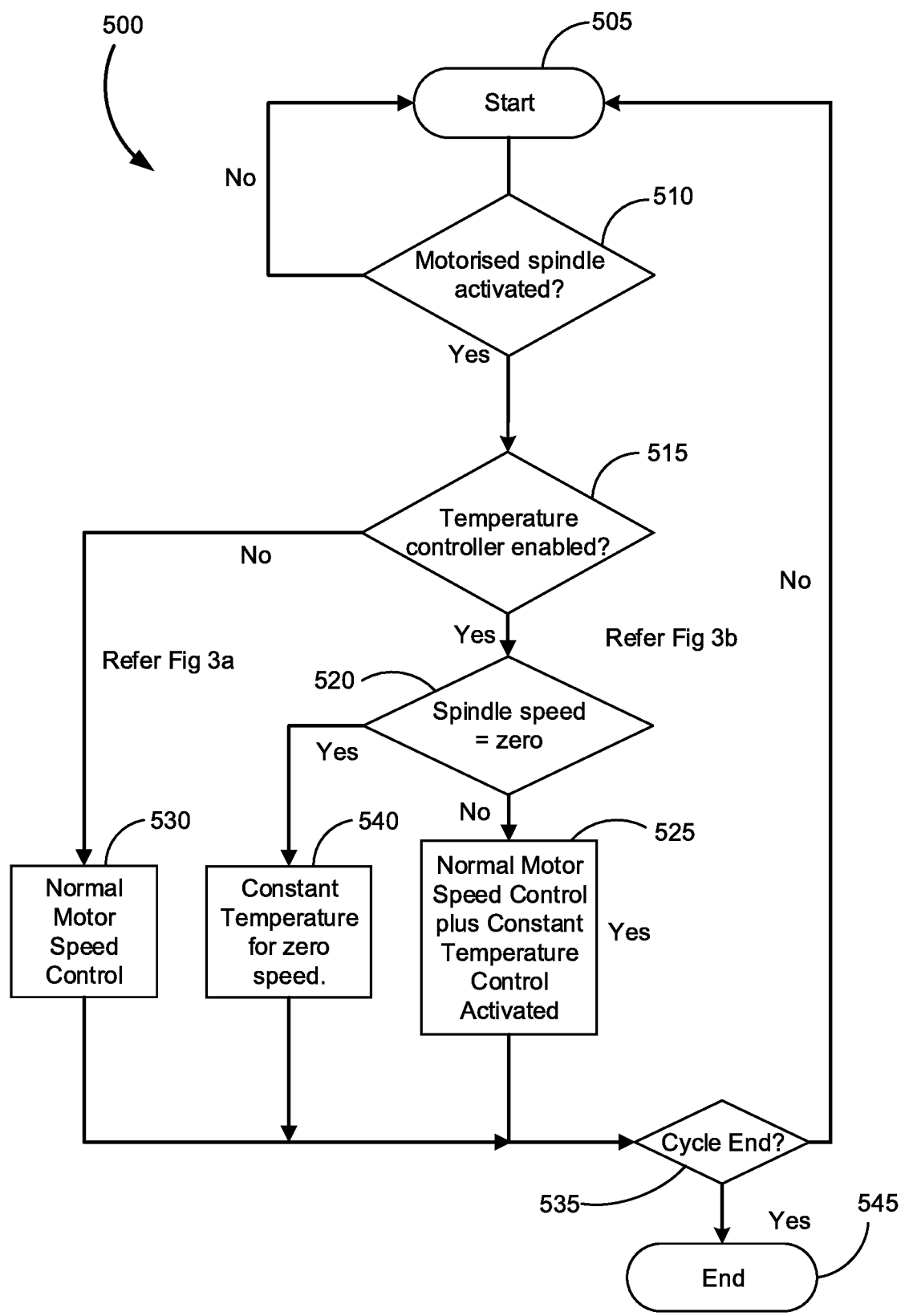
FIG. 5 is a flow diagram illustrating a further embodiment of a method of the present invention including detail of steps for constant temperature control.

As shown in FIG. 4, in an embodiment, described further with reference to FIG. 5, processing component 3 receives $T_{measured}$ as an input which is the actual motor temperature in degrees and $T_{set}$ which is the desired motor temperature set by the operator in degrees. The difference between these temperatures is an input for processing component 3. Processing component 3 provides its output voltage magnitude (V) for the spindle at zero speed.

Returning to FIG. 2c, control then moves to step 225c where it is further determined whether or not the cycle has ended and if it has, control moves to step 235c, otherwise control returns to step 205c. If at step 215c the constant temperature control was not enabled, control simply moves to step 230c, as shown in FIG. 2c. It will be noted the output of the V/F open loop curve block in FIG. 3b is only the magnitude of the voltage to the motor. This is transferred to 3 phase voltage, taking account of the rotating electrical angle $\ominus$ of the motor.

As shown in FIG. 3a, it will be understood the operation component 320 receives as an input a spindle speed command $\omega_{CMD}$ in RPM (revolutions per minute) as well as $\omega_1$ spindle speed at breakpoint 1 ($P_1$) in RPM, $V_1$ voltage at breakpoint 1 ($P_1$) in volts (V), $\omega_2$ spindle speed at breakpoint 2 ($P_2$) in RPM, $V_2$ which is the voltage at breakpoint 2 ($P_2$) in volts (V), $\omega_3$ namely spindle speed at breakpoint 3 ($P_3$) in RPM, and $V_3$ voltage at breakpoint 3 (P3) in volts (V).

The $V_2$ value (voltage at breakpoint 2 ($P_2$)) shown in FIG. 3a and FIG. 3b, is determined by the sum of outputs from the constant temperature controller as shown in FIG. 4.

FIG. 5 is a flow diagram illustrating a further embodiment of a method 500 of the present invention which may lie in software or firmware within hardware on a CNC system 100 or may reside in a computer associated with a system which controls operation of a motorised spindle 135. This embodiment of the invention allows for instances where constant temperature is maintained when the spindle speed is zero (i.e. when the spindle is stationary). This situation may occur when workpieces are being loaded to the machine and no grinding (for example) is taking place. The present embodiment together with processing component 3 (FIG. 4) reduces the need for warm-up between loading and grinding stages.

The method 500 begins at step 505, where a user may, via the user interface 105 of FIG. 1a, enter a desired temperature set point for the motorised spindle 135.

Control then moves to step 510, where it is determined whether or not the motorised spindle has been activated (for example by the user via user interface 105).

In the event that the motorised spindle 135 is activated, control moves to step 515 in which it is determined whether the constant temperature controller 310 is enabled otherwise, control returns to step 505.

If step 515 determines the constant temperature controller 310 is enabled, then control moves to step 520, where it is determined whether or not the spindle speed is equal to zero. In the event the spindle speed is not equal to zero, then control then moves to step 525 in which the motorised spindle 135 is controlled via voltage provided from the drive for the motorised spindle 115 as per FIG. 1a. The motorised spindle 135, as per FIG. 1a, is fitted with an encoder/proxy switch 130 to provide feedback signals on the position or velocity of the motorized spindle 135 and temperature by the thermistor 140. As noted above, the drive 115 controls the position and speed of the motorised spindle 135 and may store data generated while the motorised spindle 135 is in operation.

If step 515 determined the constant temperature controller 310 is enabled and step 520 determined that the spindle speed is zero, control moves to step 540 in which the motorised spindle is controlled via constant temperature control at zero speed (V) as shown in FIG. 3a and processing component 3 in FIG. 4.

Steps 525 and 530 are carried out in the same way as corresponding steps 230c and 220c in FIG. 2c.

As shown in FIG. 4, processing component 3 receives $T_{measured}$ as an input which is the actual motor temperature in degrees and $T_{set}$ which is the desired motor temperature set by the operator in degrees. The difference between these temperatures is an input for processing component 3. Processing component 3 provides its output voltage (V) for the spindle at zero speed.

Returning to FIG. 5, control then moves to step 535 where it is determined whether or not the cycle has ended and if it has, control moves to step 545, otherwise control returns to step 505. If at step 515 the constant temperature control was not enabled, control simply moves to step 530. It will be noted the output of the V/F open loop curve block in FIG. 3b is only the magnitude of the voltage to the motor. This is transferred to three phase voltage, taking account of the rotating electrical angle $\ominus$ of the motor.

It will be noted that due to the simplification of this proposed method, the motor temperature can only be possibly increased from the existing value. Temperature controllability at light load is better than heavy load. If the motor is already working at full load condition, then the temperature controllability of the proposed method cannot be applied.

The invention claimed is:

1. A method of controlling the temperature of an induction motorized spindle by adjusting the electric losses in the induction motorized spindle, including the steps of:
    (a) determining the required load on the induction motorized spindle and providing a first motor voltage to meet the required load;
    (b) providing a predetermined temperature set point for the induction motorized spindle;
    (c) determining the temperature of the induction motorized spindle;
    (d) comparing the temperature of the induction motorized spindle against the predetermined temperature set point, wherein the predetermined temperature set point is determined over a predetermined time period;
    (e) determining, based on the temperature of the induction motorized spindle and the predetermined temperature set point, a secondary motor voltage;
    (f) adjusting the motor voltage based on the calculated voltage in steps (a) and (e).

2. The method of claim 1, wherein step (f) includes increasing the second motor voltage if the temperature is below the predetermined temperature set point.

3. The method of claim 1, wherein step (f) includes decreasing the second motor voltage if the temperature is above the predetermined temperature set point.

4. The method of claim 1, wherein the induction motorized spindle is an induction motor and step (f) includes varying the flux in the motor by varying the motor voltage.

5. The method of claim 1, wherein the predetermined temperature set point is a temperature range.

6. A system for controlling the temperature of an induction motorized spindle by adjusting the electric losses in the induction motorized spindle, the system including: an interface for providing one or more parameters to a CNC component which controls one or more drive units and in turn one or more induction motorized spindles, the CNC component programmed to:
    (a) determine the required load on the induction motorized spindle and providing a first motor voltage to meet the required load;
    (b) provide a predetermined temperature set point for the induction motorized spindle, wherein the predetermined temperature set point for the induction motorized spindle is set by the operator depending on the desired load sequence;
    (c) determine the temperature of the induction motorized spindle;
    (d) compare the temperature of the induction motorized spindle against the predetermined temperature set point;
    (e) determine, based on the temperature of the induction motorized spindle and the predetermined temperature set point, a secondary motor voltage;
    (f) adjust the motor voltage based on the calculated voltage in steps (a) and (e); and
    (g) adjust the motor load measurement based on the measured motor speed and actual motor voltage.

7. The system of claim 6, wherein step (g) incorporates a motor datasheet associated with the induction motorized spindle, when adjusting the motor load measurement.

8. An electric motor control system including: an interface for providing one or more parameters to one or more drive units which regulates the temperature of one or more motors by adjusting the terminal voltage of the motor whilst maintaining specified speed and torque, wherein the motor is integrated into a machine tool spindle; and wherein the temperature of the synchronous motorised spindle where the varying losses are modified by varying flux producing current, and still satisfying load and speed requirements, using the steps including:
    (a) determining the required load on the synchronous motorised spindle and providing a first motor voltage to meet the required load;
    (b) providing the predetermined temperature set point for the synchronous motorised spindle;
    (c) determining the temperature of the synchronous motorised spindle;
    (d) comparing the temperature of the synchronous motorised spindle against the predetermined temperature set point;
    (e) adjusting the motor flux producing current, and still satisfying load and speed requirements.

9. The electric motor control system of claim 8, wherein the motor is an induction motor.

10. The electric motor control system of claim 8, wherein a motor flux is provided, the motor flux being provided by permanent magnets.

11. The electric motor control system of claim 8, wherein the motor is a synchronous motor.

12. A method of controlling the temperature of an electric motor having a motorised spindle and constant temperature controller including the steps of:
    a. providing a desired temperature set point for the motorised spindle;
    b. selectively applying, in response to the status of the constant temperature controller:
        (i) constant voltage/frequency to control the speed of a motor where the constant temperature controller is disabled; else
        (ii) a controlled voltage to the motor such that there is sufficient power to rotate the motor for the given speed and load and adjusting the temperature via the constant temperature controller;
    c. determining the speed of the motorised spindle and in response to the speed of the motorised spindle being equal to zero;
        (i) controlling the motorised spindle via constant temperature control at zero speed;
        else if the speed is not zero;
        (ii) applying a controlled voltage to the motor such that there is sufficient power to rotate the motor for the given speed and load and adjusting the temperature via the constant temperature controller.

* * * * *